United States Patent
Wu et al.

(10) Patent No.: US 9,815,456 B2
(45) Date of Patent: Nov. 14, 2017

(54) METHODS AND SYSTEMS FOR TEMPERATURE SENSOR FAULT DETECTION

(71) Applicant: Ford Global Technologies, LLC, Dearborn, MI (US)

(72) Inventors: Hongjie Wu, Canton, MI (US); Yuqing Tang, Northville, MI (US); Shahram Zarei, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 316 days.

(21) Appl. No.: 14/540,294

(22) Filed: Nov. 13, 2014

(65) Prior Publication Data

US 2016/0137192 A1    May 19, 2016

(51) Int. Cl.
| | |
|---|---|
| B60W 20/50 | (2016.01) |
| B60W 40/12 | (2012.01) |
| B60W 30/184 | (2012.01) |
| B60W 10/08 | (2006.01) |
| B60W 10/02 | (2006.01) |
| B60W 50/14 | (2012.01) |
| B60K 6/445 | (2007.10) |
| B60L 3/12 | (2006.01) |

(52) U.S. Cl.
CPC .............. *B60W 20/50* (2013.01); *B60K 6/445* (2013.01); *B60L 3/12* (2013.01); *B60W 10/02* (2013.01); *B60W 10/08* (2013.01); *B60W 30/1843* (2013.01); *B60W 40/12* (2013.01); *B60W 50/14* (2013.01); *B60W 2510/087* (2013.01); *B60W 2530/00* (2013.01)

(58) Field of Classification Search
CPC ................................................... B60L 11/1803
See application file for complete search history.

(56) References Cited

U.S. PATENT DOCUMENTS

| | | | |
|---|---|---|---|
| 6,091,324 A | 7/2000 | Arsenault et al. | |
| 7,163,080 B2 | 1/2007 | Fardoun et al. | |
| 8,244,427 B2 | 8/2012 | Weiss et al. | |
| 8,701,803 B2* | 4/2014 | Ozaki | B60L 3/0061 180/65.265 |
| 2011/0288723 A1* | 11/2011 | Weiss | G01K 15/00 701/29.2 |
| 2012/0203408 A1 | 8/2012 | Migita | |
| 2014/0175867 A1* | 6/2014 | Sung | F16H 57/0412 307/9.1 |
| 2016/0082946 A1* | 3/2016 | Kodawara | B60K 6/28 701/22 |
| 2016/0107635 A1* | 4/2016 | Kodawara | B60K 6/48 701/22 |
| 2016/0352275 A1* | 12/2016 | Senoo | H02P 29/662 |

* cited by examiner

*Primary Examiner* — Thomas G Black
*Assistant Examiner* — Ana Thomas
(74) *Attorney, Agent, or Firm* — David B. Kelley; Brooks Kushman P.C.

(57) ABSTRACT

A vehicle includes a transmission, a motor, and at least one controller. The motor is configured to be selectively coupled to the transmission. The at least one controller is programmed to output a fault for a coil temperature sensor of the motor based on an oil temperature of the transmission, a phase current of the motor, and a temperature change in a coil of the motor.

16 Claims, 3 Drawing Sheets

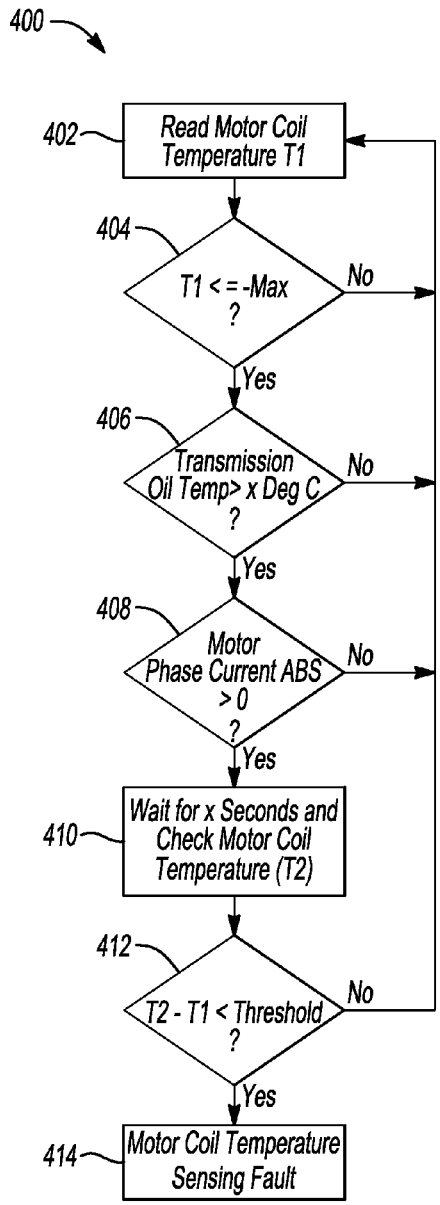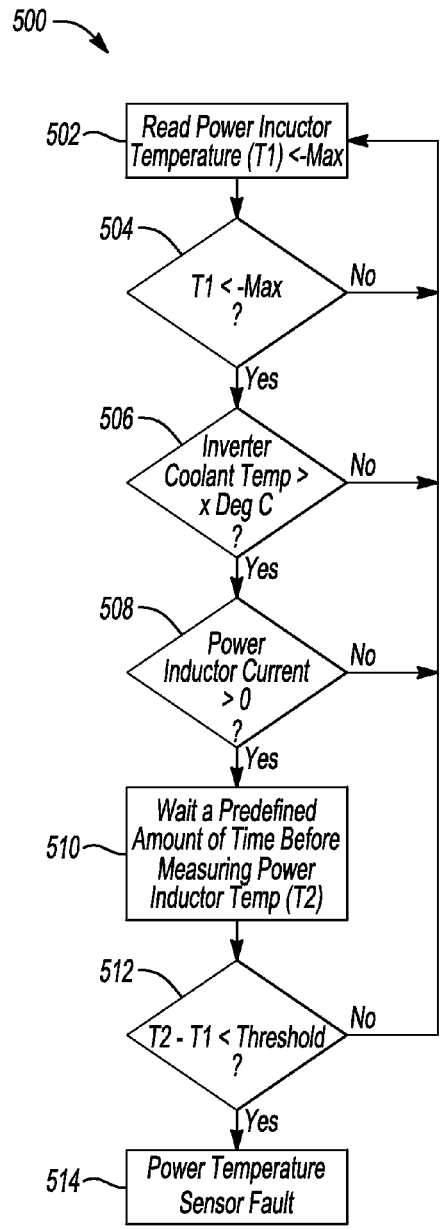
Fig-5
Fig-6

METHODS AND SYSTEMS FOR TEMPERATURE SENSOR FAULT DETECTION

TECHNICAL FIELD

This disclosure relates to temperature sensors and fault detection methods therefor.

BACKGROUND

Vehicles are comprised of a host of independent and interdependent systems, subsystems, and components. Primary and secondary controllers process various signals transmitted by physical sensors to determine the proper functioning of the sensors and related onboard systems. An example of a physical sensor is a temperature sensor.

In a typical hybrid vehicle, a temperature sensor may monitor an electric motor using one or more thermistors. The temperature sensor at the electric motor may measure the temperature of the motor windings. The primary and/or secondary controllers may include diagnostic logic that is hardcoded to determine a fault at the temperature sensor. The diagnostic logic ordinarily must be calibrated based on a particular temperature sensing circuit. An incorrect diagnostic detection for the temperature sensor may impact performance of the electric motor. As a result, conventional temperature diagnostic logic may not adequately diagnose a thermistor of the temperature sensor.

SUMMARY

A vehicle electric drive system includes at least one controller programmed to output a motor coil temperature sensor fault in response to a motor coil temperature being less than a coil temperature threshold, a transmission oil temperature being greater than an oil temperature threshold, a motor phase current having a value other than zero, and a change in the motor coil temperature being less than a change threshold.

A vehicle includes a transmission, a motor, and at least one controller. The motor is configured to be selectively coupled to the transmission. The at least one controller is programmed to output a fault for a coil temperature sensor of the motor based on an oil temperature of the transmission, a phase current of the motor, and a temperature change in a coil of the motor.

A temperature fault diagnostic method for a motor coil temperature sensor includes, in response to a first motor coil temperature being less than a coil threshold, a transmission oil temperature being greater than an oil threshold, a motor phase current having a magnitude greater than zero for a predefined period of time, and a difference between a second motor coil temperature and the first motor coil temperature being less than a change threshold, outputting by a controller a motor coil temperature sensor fault.

BRIEF DESCRIPTION OF THE DRAWINGS

FIG. 5 is an illustrative flowchart of a thermistor circuit fault diagnostic method using information related to a temperature measured by the thermistor; and FIG. 6 is an illustrative flowchart of a thermistor circuit fault diagnostic method using information related to a temperature measured by the thermistor.

DETAILED DESCRIPTION

Figure 1:
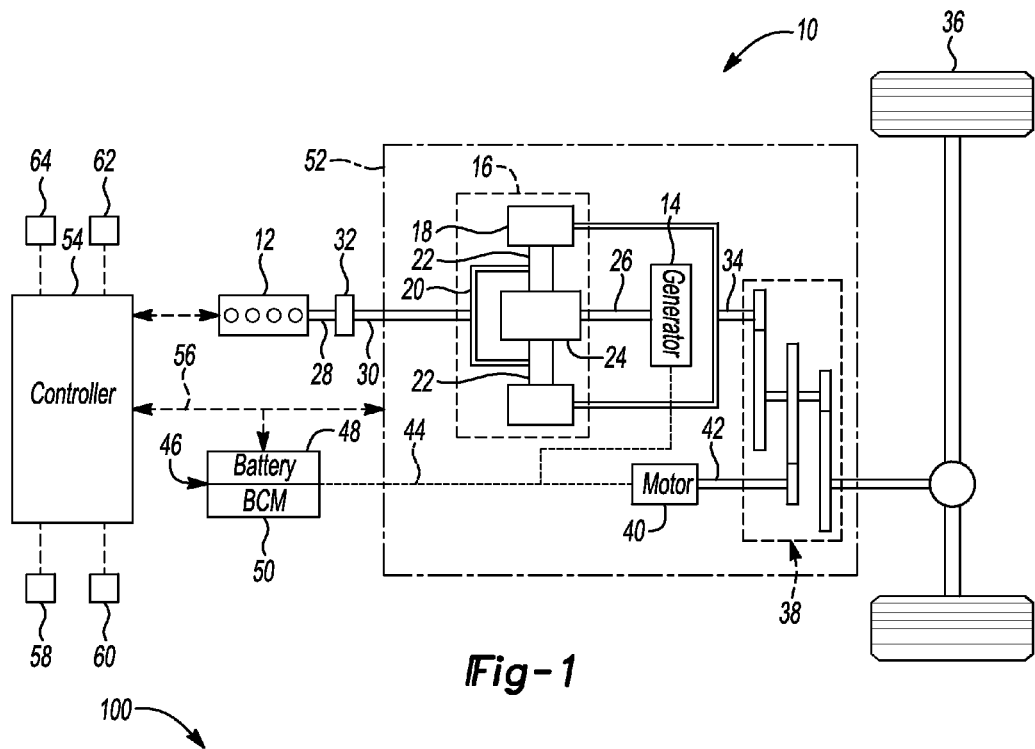
FIG. 1 is a simplified, exemplary schematic representation of a hybrid electric vehicle (HEV)

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The disclosure relates to methods and systems to detect temperature sensor faults using related system information. A temperature sensor may comprise a thermistor. The thermistor may be widely used in electrified vehicles for temperature monitoring and protection functions. A temperature sensor fault detection method may be based on a temperature signal guard band which helps to identify the signal anomaly. The signal guard band provides a diagnostic range between a valid sensing signal range and the minimum and/or maximum voltage regions of the sensor. The signal guard band may limit the effective signal range and have negative impact on signal resolution and sensing accuracy. The signal guard band may be a calibratable value to detect a thermistor fault. The signal guard band may be calibrated for a sensor used to monitor a specific component or system.

For example, a temperature sensing circuit includes an electrical signal from zero volts (0V) to five volts (5V) having a valid temperature signal range of zero point one volts (0.1V) to four point nine volts (4.9V). The signal guard band may be calibrated to one hundred millivolts (100 mV). Therefore, the controller may detect a fault at the sensor if the feedback is less than zero point one volts (0.1V) or greater than four point nine volts (4.9V).

In another example, a sensing circuit may have a five volt (5V) reference voltage, therefore an output of the sensing circuit may be read by the controller from zero point five volts (0.5V) to four point five volts (4.5V). The controller may have hardware configured to execute one or more software applications to monitor the performance of the sensing circuit. The one or more software applications may include a temperature sensor diagnostic method. The temperature sensor diagnostic method may include the signal guard band. In this example, the signal guard band may be calibrated to one hundred millivolts (100 mV). The signal guard band may be applied to the lower end of the sensor read at zero point five volts (0.5V) and to the upper end of the sensor read at four point five volts (4.5V). If the sensing circuit is open, the output may be read by the controller as four point ninety-five volts (4.95V) exceeding the signal guard band at the upper end of the sensor read. If the controller receives a sensing circuit output of four point sixty-one volts (4.61V), greater than the maximum sensor output value of four point five volts (4.5V) by more than one hundred millivolts (100 mV), the controller may set a sensor diagnostic fault as an open circuit.

The thermistor's resistance to temperature relationship is non-linear, therefore in order to have enough signal resolution and accuracy at a high temperature region the signal guard band is calibrated to be compressed to a lesser value. The high temp region may be the most sensitive and critical operation region for a hybrid electric vehicle. The signal guard band compressed at the lesser value may cause the temperature sensing circuit fault detection to be un-reliable. For example, the temperature sensing circuit detection method with the signal guard band compressed at the lesser value may cause unfavorable impact on over temperature protection and the vehicle's performance.

The temperature sensor fault method using related system information may overcome the limitations of the guard band fault detection method. The temperature sensor fault method proposed in this disclosure may improve the fault detection reliability and sensing accuracy. By fully utilizing system information available to a vehicle computing system, the strategies proposed in this disclosure make the temperature sensor fault detection more robust with better noise immunity while improving the vehicle's system operation capability.

FIG. 1 is a simplified, exemplary schematic representation of a vehicle 10, which may include an engine 12 and a first electric machine, or generator 14. The engine 12 and the generator 14 may be connected through a power transfer arrangement, which in this embodiment, is a planetary gear arrangement 16. Of course, other types of power transfer arrangements, including other gear sets and transmissions, may be used to connect the engine 12 to the generator 14. Furthermore, the planetary gear arrangement 16 may include a ring gear 18, a carrier 20, planet gears 22, and a sun gear 24.

The generator 14 can also output torque to a shaft 26 connected to the sun gear 24. Similarly, the engine 12 can output torque to a crankshaft 28, which may be connected to a shaft 30 through a passive clutch 32. The clutch 32 may provide protection against over-torque conditions. The shaft 30 may be connected to the carrier 20 of the planetary gear arrangement 16. The ring gear 18 may be connected to a shaft 34, which may be connected to a first set of vehicle drive wheels, or primary drive wheels 36, through a gear set 38.

The vehicle 10 may include a second electric machine, or motor 40, which can be used to output torque to a shaft 42 connected to the gear set 38. Other vehicles within the scope of the present disclosure may have different electric machine arrangements, such as more or fewer than two electric machines. In the embodiment shown in FIG. 1, the electric machine arrangement (i.e. the motor 40 and the generator 14) can both be used as motors to output torque. Alternatively, each can also be used as a generator, outputting electrical power to a high voltage bus 44 and to an energy storage system 46, which includes a battery 48 and a battery control module (BCM) 50.

The battery 48 may be a high voltage battery capable of outputting electrical power to operate the motor 40 and the generator 14. The BCM 50 acts as a controller for the battery 48. Other types of energy storage systems may be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear arrangement 16, and a portion of the second gear set 38 may generally be referred to as a transmission 52. To control the engine 12 and components of the transmission 52 (i.e., the generator 14 and motor 40) a vehicle computing system, shown generally as controller 54, may be provided. Although it is shown as a single controller, it may include multiple controllers which may be used to control multiple vehicle systems. For example, the controller 54 may be a vehicle computing system/powertrain control module (VCS/PCM). In another example, a hybrid electric drive system may package the VCS/PCM (e.g., controller 54) which controls the transmission 52 with an inverter that drives generator 14 and/or motor 40.

A controller area network (CAN) 56 may allow the controller 54 to communicate with the transmission 52 and the BCM 50. Just as the battery 48 includes a BCM 50, other devices may have their own controllers. For example, an engine control unit (ECU) may communicate with the controller 54 and may perform control functions on the engine 12. In addition, the transmission 52 may include a transmission control module (TCM), configured to coordinate control of specific components within the transmission 52, such as the generator 14 and/or the motor 40 through an inverter (not shown), and report operating conditions to the controller 54. The operating conditions may include temperature and current reading of one or more systems, subsystems, and components. Some or all of these various controllers may make up the vehicle computing system to provide a control system for the vehicle in accordance with the present disclosure.

Although illustrated and described in the context of the vehicle 10, which is a hybrid electric vehicle (HEV), it is understood that embodiments of the present disclosure may be implemented on other types of vehicles, such as those including other hybrid systems, those powered by an electronic motor alone, or those powered by an internal combustion engine alone. It is further understood that embodiments of the present disclosure may be implemented on vehicles which incorporate at least one alternative energy recovery and storage device such as a flywheel device, a hydraulic device, or a pneumatic device. Lastly, the present disclosure contemplates that the alternative energy recovery and storage device may, or may not, be integrated with a secondary propulsion machines such as a liquid fueled engine or electric machine.

Also shown in FIG. 1 are simplified schematic representations of a braking system 58, an accelerator pedal 60, and an air conditioning system 62. The braking system 58 may include such things as a brake pedal, position sensors, pressure sensors, temperature sensors, or some combination thereof, as well as a mechanical connection to the vehicle wheels, such as the wheels 36, to effect friction braking. One or more embodiments of the present disclosure further contemplate that the braking system 58 may also include a regenerative braking system, wherein braking energy is captured and stored as electrical energy in the battery 48. Of course, it should be noted that a regenerative braking system other than an electrical regenerative braking system may also be included as part of the braking system 58 (e.g., a hydraulic regenerative braking system, mechanical regenerative braking system, or the like). Similarly, the accelerator pedal 60 may include one or more sensors, which, like the sensors in the braking system 58, communicate with the controller 54.

The air conditioning system 62 also communicates with the controller 54. The on/off status of the air conditioning system can be communicated to the controller 54, and may be based on, for example, the status of an operator actuated switch, or the automatic control of the air conditioning system 62 based on related functions such as window defrost. In addition to the foregoing, the vehicle 10 may include a display system 64 to provide information indicative of the driving state of the vehicle 10.

Figure 2:
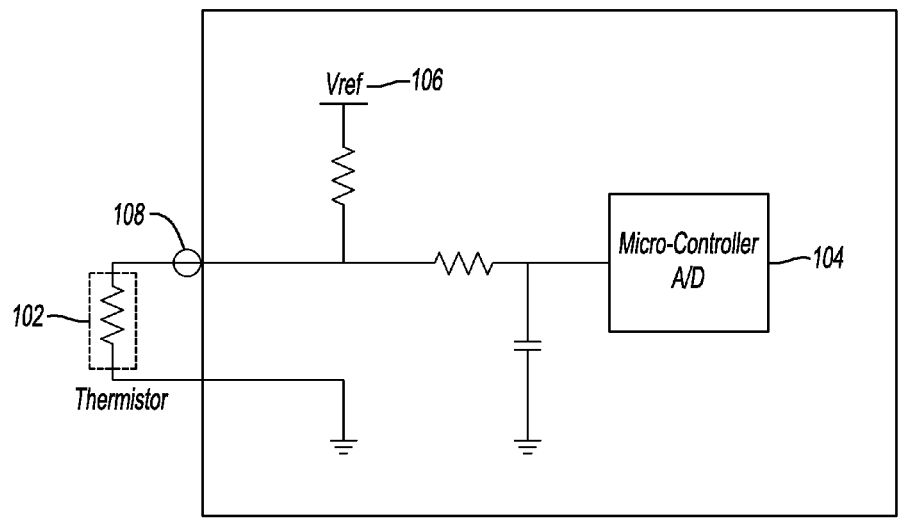
FIG. 2 is an exemplary schematic representation of a negative temperature coefficient (NTC) type thermistor sensing circuit.

FIG. 2 is an exemplary schematic representation of a negative temperature coefficient type thermistor 102 sensing circuit according to one or more embodiments of the present disclosure. The thermistor 102 may be used in one or more control systems of the vehicle computing system. For example, the thermistor may be used in an electric drive system (e.g., motor 40, generator 14, transmission, etc.) of the HEV. The thermistor 102 may include, but is not limited to, a negative temperature coefficient (NTC) type thermistor and a positive temperature coefficient (PTC) type thermistor. The NTC thermistor 102 may provide the performance characteristic such that the lower the temperature, the higher the resistance; and the higher the temperature, the lower the resistance.

As shown in FIG. 2, the controller interface 104 connected to the thermistor 102 may receive a signal voltage that is very close to a voltage reference 106 at a minimum negative (or below zero degrees Celsius) temperature environment. The controller interface 104 may be in communication with the vehicle computing system (e.g., controller 54). In another embodiment, the controller interface 104 may be the controller 54 to control the engine 12, transmission 52, and components therein. The minimum negative temperature (e.g., minus 40 degrees Celsius) may cause the fault detection method to have a very minimal guard band to detect an error.

For example, a minus forty degrees Celsius (−40 C) measurement via the thermistor 102 may be received by the controller interface 104 having a voltage of four point ninety-five volts (4.95V). An open circuit 108 measurement at the thermistor 102 may have a voltage of four point ninety-seven volts (4.97V). The difference between these two values may be a small value such that the controller 104 may not be able to measure the difference between the minus forty degrees Celsius (−40) reading or an open circuit reading of the sensing circuit. The controller interface 104 may set an open circuit fault when in actuality the thermistor 102 is measuring a minus forty degrees Celsius temperature. The temperature fault may be set because a minus forty degrees Celsius reading may be equivalent to the open circuit 108 measurement. The signal guard band may have too small of a calibration value to detect the difference between a minus forty degrees Celsius reading and an open circuit fault.

In another example, a one hundred and fifty degrees Celsius (150 C) measurement via the thermistor 102 may be received by the controller interface 104 having a voltage of zero point five volts (0.5V). A short to ground measurement, and/or current leak, at the thermistor 102 may have a voltage of 0.5V. The controller interface 104 may set a temperature fault when in actuality the thermistor 102 is measuring a one hundred and fifty degrees Celsius temperature. The temperature fault may be set because the controller interface 104 may read the one hundred fifty degrees reading as a short to ground circuit fault.

Figure 3:
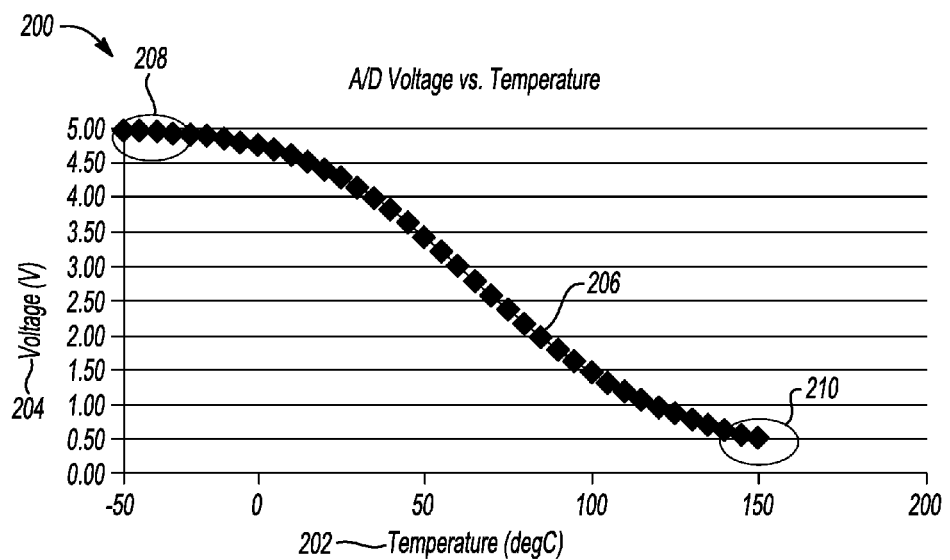
FIG. 3 is an exemplary graph of the NTC type thermistor with a five volt reference voltage to measure a temperature.

FIG. 3 is an exemplary graph of the NTC type thermistor 102 with a five volt reference voltage 106 to measure a temperature of one or more control systems of the vehicle computing system. The graph comprises an x-axis representing temperature 202 and a y-axis representing voltage 204. The controller interface 104 to the thermistor 106 may include, but is not limited to, BCM 50, vehicle computing system (i.e., controller 54), ECU, TCM, and/or a combination thereof. The controller interface 104 may receive a temperature measurement 206 from the thermistor 102 using an analog to digital converter. The analog to digital converter is a device that may convert the voltage to a digital number that represents the temperature measurement 206.

The thermistor 102 may transmit the temperature measurements 206 to the controller interface 104 based on the voltage across the resistance of the thermistor 102. For example, the lower the temperature, the higher the resistance at the thermistor 102 which converts to a higher voltage measurement 208 at the controller interface 104. The higher the temperature, the lower the resistance at the thermistor 102 which converts to a lower voltage measurement 210 at the controller interface 104.

Figure 4:
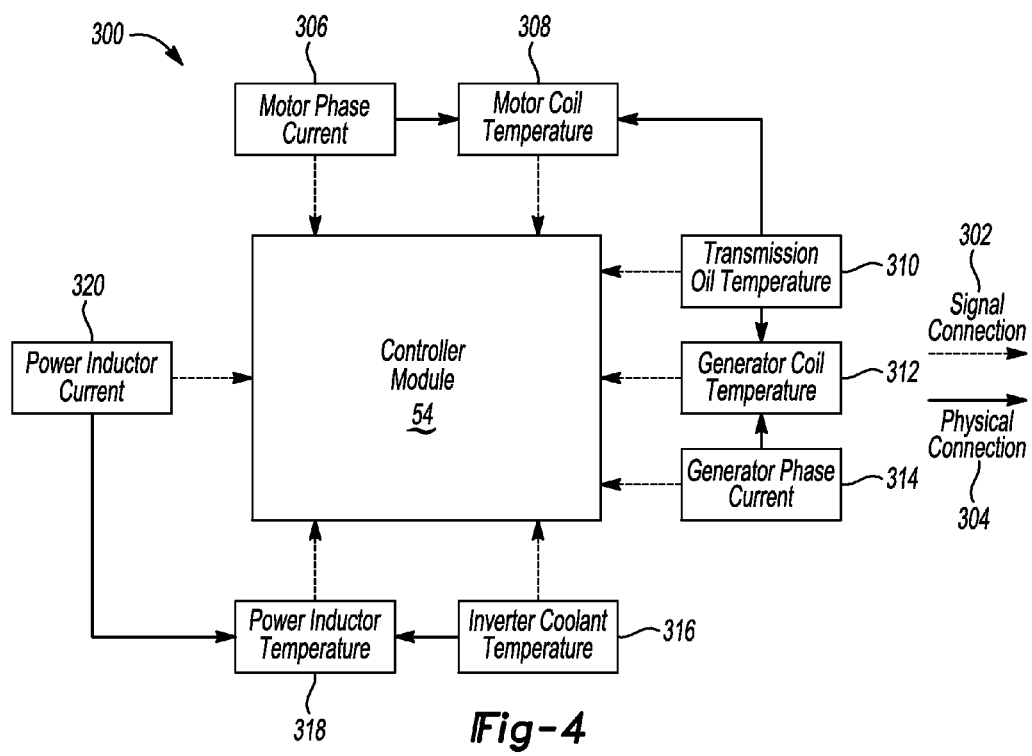
FIG. 4 is an exemplary schematic representation of a portion of the HEV electric drive system sensing diagram.

FIG. 4 is the electric drive system 300 sensing diagram according to one or more embodiments of the present disclosure. The HEV may be configured based on several electric drive system 300 structures and components such that one or more signals may not be available as shown in FIG. 4. The temperature sensor diagnostic method may be applied to several electric drive system 300 structures to detect the temperature sensing circuit fault by using system information.

The electric drive system 300 in electrified vehicles may sense multiple temperatures throughout the system. These sensed temperatures may include one or more thermistors 102 at a motor coil 308, generator coil 312, transmission oil 310, and inductor 318. In response to a signal connection 302 and/or physical connection 304 among components and their temperatures, the method may determine the rationality of one temperature reading so that it may be crossed checked with other temperature readings. For example, a motor coil temperature 308 reading may be cross checked with the transmission oil temperature 310 reading and/or the generator coil temperature 312 based on the physical connection 304 between the components.

In another example, an oil temperature sensor 310 may indicate a high temperature while a motor temperature sensor 308 indicates a low temperature via the signal connection 302, the temperature sensor diagnostic method executed on hardware at the controller 54 may not be able to recognize which sensor is inaccurate based on these two readings. The temperature sensor diagnostic method may also include a generator temperature sensor 312 reading that indicates a high temperature, therefore enabling the method to recognize that the temperature reading should be high for the related components that are physically connected 304. The method may recognize the motor sensor 308 may have a fault based on the low temperature reading. The temperature sensor diagnostic method may use temperature readings from the motor and generator because they are physically related since both are cooled by the transmission oil. If the transmission oil temperature 310 is high, the generator temperature may be at least warm even if the generator is not in operation. The motor temperature sensor 308 outputting a low temperature reading while the oil temperature sensor 310 and the generator temperature sensor 312 are reading a higher temperature enables the method to recognize that the motor temperature sensor 308 may have a fault.

The temperature sensor diagnostic method may use addition information like motor phase current 306, generator phase current 314, and/or power inductor current 320 to detect a thermistor fault. The motor phase current 306, generator phase current 314, and/or power inductor current 320 may be available to the controller 54 so that the temperature fault detection method may be determined based on information received from the one or more components.

For example, the motor phase current 306 received at the controller 54 may provide additional information such that the temperature sensor diagnostic method may determine whether there is a temperature fault with one or more temperature sensors in components related to the electric motor. The motor phase current 306 indicates that the motor is either in an operation state or a nonoperation state. While the motor is in an operation state, the temperature sensor diagnostic method executed at the controller 54 may be able to recognize an increase in temperature readings based on the association of the increase in motor current causing the motor winding loss to increase. The motor winding loss increase may cause the motor winding temperature to increase in temperature. After a certain period of time during which the motor has been in an operation state, the controller 54 may receive an increase in the motor winding temperature via the motor coil temperature 308. For example, if the temperature sensor diagnostic method recognizes substantially little to no change in the motor coil temperature sensor 308 value while the motor is having an increase in current via the motor phase current sensor 306 after a predefined amount of time, then the method may recognize a fault with the motor coil temperature sensor 308.

Though various combinations of measurement methods may be developed based on available system information, the combination of sensor information by physically related components/systems used by the temperature sensing fault method may improve the detection of sensor faults. This method may be able to get rid of the guard band limitation and improve sensing resolution and accuracy, and also make the temperature sensor fault detection more reliable.

For example, the method may improve sensing resolution by allowing thermistor readings at higher temperatures and lower temperatures without setting a false fault. The method also enables the controller 54 to provide an accurate temperature reading based on the comparison with related system and/or components.

For example, a temperature sensing circuit having a five volt (5V) reference voltage used to measure temperature may require a guard band to differentiate from sensing an open circuit or short from a temperature reading of extreme low or high temperatures. The guard band may be calibrated to have a zero point five volt (0.5V) diagnostic range for both high temperature and low temperature. The temperature sensor circuit input range may measure the high and low temperature from zero point five volts (0.5V) to four point five volts (4.5V) to correspond to a one hundred and fifty degrees Celsius (150 C) to a minus forty degrees Celsius (-40 C) temperature range. Based on the temperature sensor circuit range, the controller may comprise a four volt (4V) range (e.g., four volt (4V) range derived from the four point five volts (4.5V) subtracted by zero point five volts (0.5V)) to represent a temperature range of one hundred and fifty degrees Celsius (150 C) to a minus forty degrees Celsius (-40 C). The temperature sensing circuit may monitor a one hundred and ninety degrees Celsius (e.g., one hundred and ninety degrees Celsius derived from one hundred and fifty degrees Celsius (150 C) subtracted by minus forty degrees Celsius (-40 C)) temperature range using four volts (4V), therefore a small voltage change due to noise may affect the sensor's accuracy.

If the guard band is eliminated and the temperature sensor diagnostic method is applied, the controller 54 may use a temperature sensor circuit input range of the entire available voltage of the sensor from zero volts (0V) to five volts (5V) for representing the temperature range stated above. With the larger temperature sensor circuit input range the method may improve accuracy of a temperature reading by recognizing and identifying a small voltage change in the circuit. The five volt (5V) range used to represent the temperature range of one hundred and fifty degrees Celsius (150 C) to a minus forty degrees Celsius (-40 C) may be used as the normal range of sensor output such that at high temperatures, the voltage versus temperature slew rate may be larger. The temperature sensor diagnostic method may have a voltage range that provides a larger voltage variation such that noise in the circuit may only cause a small change in temperature. The five volt (5V) range compared to the four volt (4V) range may improve the temperature sensing accuracy. The temperature sensor diagnostic method with the elimination of the guard band may be a robust method to detect a temperature sensor fault in a noisy environment. The temperature sensor diagnostic method may ensure no false failures are detected therefore reducing the number of unnecessary part replacements.

FIG. 5 is an illustrative flowchart of the temperature sensor (e.g., thermistor) fault diagnostic method 400 using information related to a temperature measured by the thermistor. The temperature sensor fault diagnostic method 400 may comprise of one or more software applications that are executed on hardware at the vehicle computing system. The one or more applications may include instructions to populate and manage congestive prediction data for a congestive prediction system. The method 400 may be implemented using software code contained within the vehicle computing system. In other embodiments, the method 400 may be implemented in other vehicle controllers, distributed amongst multiple vehicle controllers, or a combination thereof.

Referring again to FIG. 5, the vehicle and its components illustrated in FIG. 1, FIG. 2, and FIG. 4 are referenced throughout the discussion of the method 400 to facilitate understanding of various aspects of the present disclosure. The method 400 of the temperature sensor fault diagnostic may be implemented through a computer algorithm, machine executable code, or software instructions programmed into a suitable programmable logic device(s) of the vehicle, such as the vehicle control module, another controller in communication with the vehicle computing system, or a combination thereof. Although the various operations shown in the flowchart diagram 400 appear to occur in a chronological sequence, at least some of the operations may occur in a different order, and some operations may be performed concurrently or not at all.

In operation 402, the method may receive a motor coil temperature via a thermistor located at the motor coil. The method may compare the received motor coil temperature to a predefined threshold value in operation 404. If the motor coil temperature is less than the predefined motor coil temperature threshold value, the temperature fault diagnostic method 400 may request additional temperature and current information from other components in the electric drive system. For example, if the motor coil temperature is less than minus forty degrees Celsius, the method may request additional temperature and current information from related system/components in communication with the motor.

In operation 406, the method may receive a transmission oil temperature via a thermistor located at the transmission. The method may compare the transmission oil temperature to a predefined transmission temperature value. If the transmission oil temperature is greater than the predefined transmission temperature value, the method may request motor phase current information.

In operation 408, the method may receive a motor phase current using at least one of a motor phase current sensor, a Hall effect sensor, and a shunt current sensor at the motor. The method may compare the absolute value motor phase current (i.e., motor phase ABS) to determine if the value is greater than a predefined ampere (e.g., zero ampere). The method compares the motor phase ABS because the motor current may be positive or negative depending on the direction of the current flow. The method is recognizing if the motor is in an operation state based on the magnitude of the motor current. If the motor is in an operation state, the method may compare the motor phase current to a predefined value. For example, if the motor phase current is greater than zero amperes, the method may request an additional temperature measurement of the motor coil temperature.

In operation 410, the method may wait for a predetermined amount of time before comparing a second motor coil temperature to a predefined value. The method may wait for the predetermined amount of time because as long as there is current flowing at the motor, no matter which direction, the temperature shall increase based on the motor windings. For example, the second motor coil temperature may have a higher temperature reading than the first motor coil temperature. The method may compare the first motor coil temperature in operation 402 to the second motor coil temperature in operation 410.

In operation 412, the method may calculate a difference between the second motor coil temperature from operation 410 and the first motor coil temperature in operation 402, and compare the difference to a predefined change threshold. If the temperature difference is less than the change threshold, the method may output a motor coil temperature sensing fault in operation 414.

The method may be implemented in any combination or sequence of conditions that are listed above to achieve similar results. The method may use physically related temperature information from a system and/or component to calculate the sensing signal rationality. The method may use load current from a system and/or component to determine signal rationality.

In another embodiment, the method may use historic data to determine signal rationality. For example, a motor temperature sensor output may be read by the controller every one hundred milliseconds (100 ms). The historical data for the sensor may be stored at the controller in memory such that a predetermined amount of previous reading(s) for the motor temperature sensor may be referenced for comparison. In this example, the predetermined amount of previous readings may be for the previous five seconds having a temperature value of one hundred and forty degrees Celsius (140 C). If the controller receives the next couple of new readings for the motor temperature sensor having a temperature value of minus forty degrees Celsius (−40 C), knowing the winding temperature cannot change by one hundred and eighty degrees Celsius (180 C) in less than a predetermined amount of time due to its thermal mass, the method may use the historical data from the previous readings performed five seconds early and compare it to the new sensor reading to recognize the sensing circuit may have a fault.

FIG. 6 is an illustrative flowchart of a temperature sensor fault diagnostic method using information related to a temperature measured by the thermistor according to an embodiment of this disclosure. The temperature sensor fault diagnostic method may comprise of one or more software applications that are executed on hardware at the vehicle computing system. The one or more applications may include instructions to compare the measured temperature to one or more physically connected systems and/or components temperature readings. The method 500 may be implemented using software code contained within the vehicle computing system. In other embodiments, the method 500 may be implemented in other vehicle controllers, distributed amongst multiple vehicle controllers, or a combination thereof.

In operation 502, the method may receive a power inductor temperature via a thermistor located at the power inductor. The method may compare the received power inductor temperature to a predefined threshold value in operation 504. If the power inductor temperature is less than the predefined power inductor temperature threshold value, the temperature fault diagnostic method may request for additional temperature and current information from other components in the electric drive system. For example, if the power inductor temperature is less than minus forty degrees Celsius, the controller may request additional temperature and current information from related system/components in communication with the power inductor.

In operation 506, the method may receive an inverter coolant temperature via a thermistor located at the inverter. The method may compare the inverter coolant temperature to a predefined inverter temperature value. If the inverter coolant temperature is greater than the predefined inverter temperature value, the method may request power inductor current information.

In operation 508, the method may receive a power inductor current using an inductor current sensor. The method may compare the power inductor current to determine if the value is greater than zero ampere. If the power inductor current is greater than zero ampere, the method may request an additional temperature measurement of the power inductor temperature.

In operation 510, the method may wait for a predetermined amount of time before comparing a second power inductor temperature to a predetermined value. The method may compare the first power inductor temperature in operation 502 to the second power inductor temperature in operation 510.

In operation 512, the method may calculate a difference between the second power inductor temperature from operation 510 and the initial power inductor temperature from operation 502, and compare the difference to a change threshold. If the temperature difference is less than the change threshold, the method may output a power inductor temperature sensing fault in operation 514.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle system comprising:
a controller programmed to, responsive to a motor coil temperature less than a coil temperature threshold, a transmission oil temperature greater than an oil temperature threshold, a motor phase current having a value other than zero, and a change in the motor coil temperature less than a change threshold, output to a display a motor coil temperature sensor fault without signal guard band use to improve sensor resolution and accuracy.

2. The vehicle system of claim 1, wherein the change in the motor coil temperature is based on first and second temporally separated motor coil temperatures.

3. The vehicle system of claim 1, wherein the motor coil temperature is measured using a thermistor.

4. The vehicle system of claim 1, wherein the at least one controller is further programmed to output the motor coil temperature sensor fault based on a generator coil temperature being greater than a generator temperature threshold.

5. The vehicle system of claim 1, wherein the controller is further programmed to output the fault based on the motor phase current having a value other than zero for a predefined amount of time.

6. A vehicle comprising:
a transmission;
a motor configured to be selectively coupled to the transmission; and
a controller programmed to output a fault for a coil temperature sensor of the motor based on an oil temperature of the transmission, a phase current of the motor, and a temperature change in a coil of the motor without use of a signal guard band to improve resolution and accuracy of the coil temperature sensor.

7. The vehicle of claim 6, wherein the temperature change in the coil of the motor is based on a difference between first and second temporally separated motor coil temperatures.

8. The vehicle of claim 6, wherein the phase current of the motor is measured using a phase current sensor, a Hall effect sensor, or a shunt current sensor.

9. The vehicle of claim 6, wherein the controller is further programmed to output the fault based on the oil temperature being greater than an oil temperature threshold.

10. The vehicle of claim 6, wherein the controller is further programmed to output the fault based on a generator coil temperature being greater than a generator temperature threshold and a generator phase current having a value other than zero for a predefined period of time.

11. The vehicle of claim 6, wherein the controller is further programmed to output the fault based on the motor phase current being greater or less than zero for a predefined amount of time.

12. A diagnostic method comprising:
responsive to a first motor coil temperature being less than a coil threshold, a transmission oil temperature being greater than an oil threshold, a motor phase current having a magnitude greater than zero for a predefined period of time, and a difference between a second motor coil temperature and the first motor coil temperature being less than a change threshold, outputting by a controller a motor coil temperature sensor fault without use of a signal guard band to improve sensor resolution and accuracy.

13. The diagnostic method of claim 12 further comprising measuring the motor phase current using a phase current sensor, a Hall effect sensor, or a shunt current sensor.

14. The diagnostic method of claim 12, wherein the first and second motor coil temperatures are measured using a thermistor.

15. The diagnostic method of claim 12, further comprising displaying the output.

16. The diagnostic method of claim 12, wherein the first and second motor coil temperatures are temporally separated.

* * * * *